April 23, 1940. K. KALLUSCH 2,198,169
NEGATIVE CARRIER, ESPECIALLY SUITABLE FOR PROJECTION
APPARATUS AND ENLARGING APPARATUS
Filed Aug. 29, 1938 2 Sheets-Sheet 1

INVENTOR
K. Kallusch
By
E. F. Wendroth
ATTORNEY

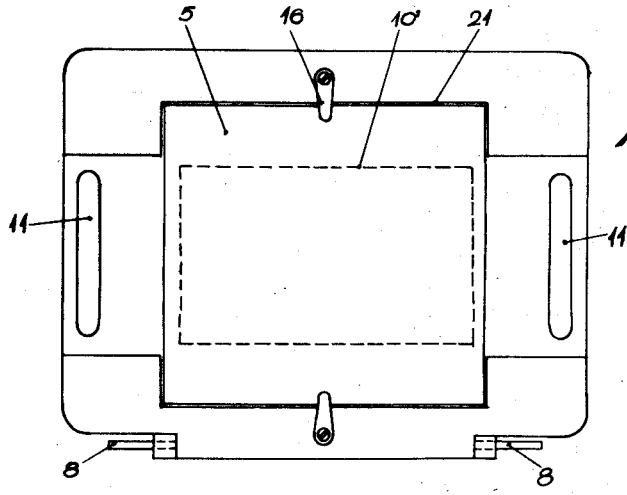
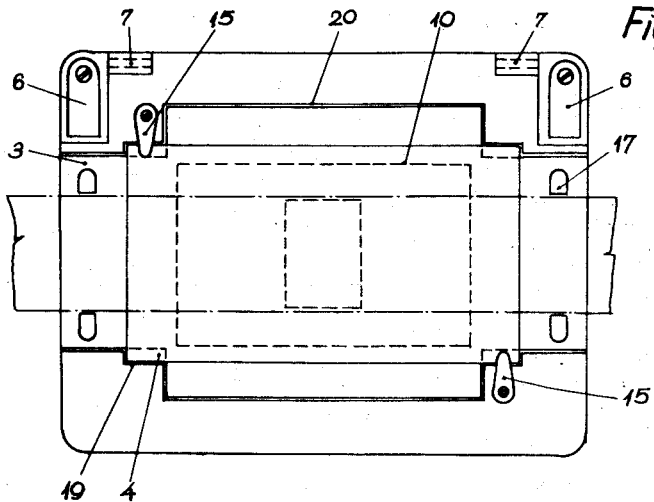
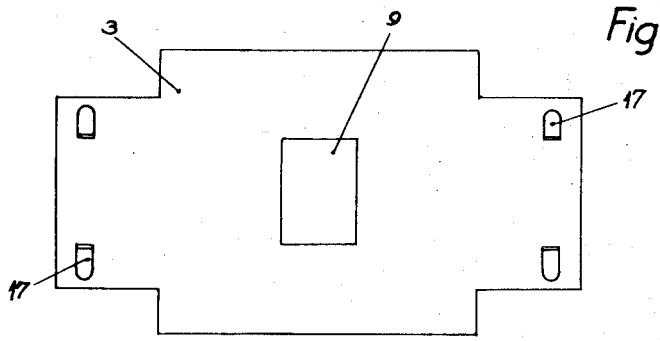

Patented Apr. 23, 1940

2,198,169

UNITED STATES PATENT OFFICE 2,198,169

NEGATIVE CARRIER, ESPECIALLY SUITABLE FOR PROJECTION APPARATUS AND ENLARGING APPARATUS

Kamillo Kallusch, Prerov, Czechoslovakia, assignor to Optikotechna, společnost s r. o., Přerov, Prerov, Czechoslovakia, a Czechoslovakian company Application August 29, 1938, Serial No. 227,410 In Czechoslovakia September 6, 1937

1 Claim. (Cl. 88—24)

The present invention relates to a negative carrier which is especially suitable for projection apparatus and enlarging apparatus. The negative carriers hitherto employed for such apparatus had the disadvantage that one carrier could not be employed for individual pictures cut from a film strip, for a strip of film and for glass plate negatives, without a slow manipulation of the apparatus and of the actual carrier device being necessary. In particular, the exchange and the fixing of the strip of film or of the glass plate involved a great deal of time. In addition, there was the risk of the negative being readily damaged, for example, by scratching or the like.

The above-mentioned disadvantages are avoided by the carrier according to the present invention which permits the use of the carrier both for a cut film or a film in the form of a strip, as well as for a glass plate negative or a member carrying the negative.

According to the present invention, there is provided a negative carrier comprising two hingedly connected frames and means on one of said frames for permitting the exchangeable mounting of various kinds of negatives thereon.

Figure 1:
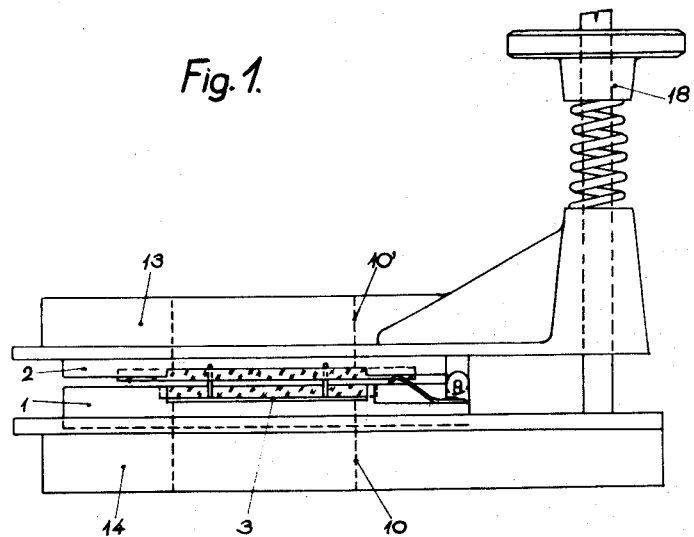
Figure 2:
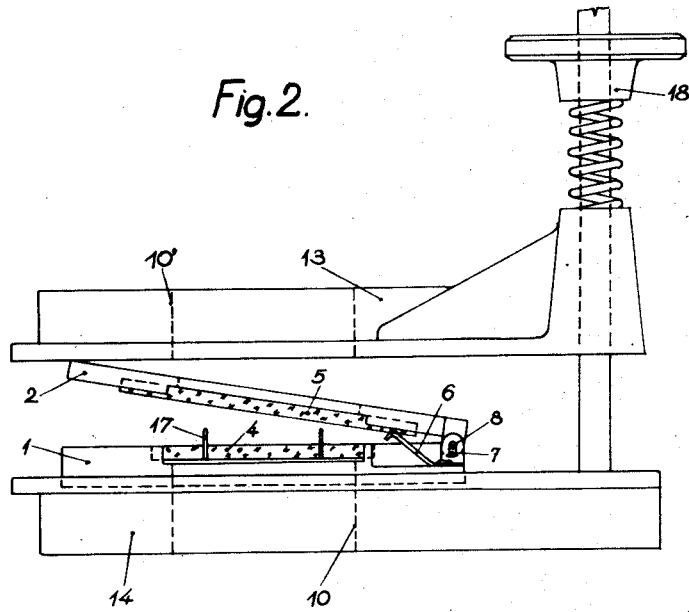

In order that the present invention may be clearly understood and readily carried into effect, the same will now be described more fully, by way of example, with reference to the accompanying drawings, in which:

Figure 1 is a front elevation of a negative carrier embodying the invention and adapted for enlarging apparatus, the frames of the carrier being clamped together, Figure 2 is a similar view to Figure 1 but showing the frames partially unclamped and the upper frame raised in angular relationship to the lower frame, Figure 3 is a bottom plan view of the upper frame, Figure 4 is a top plan view of the lower frame, and Figure 5 shows a mask detached from the frames.

Referring to the drawings, the negative carrier comprises an upper frame 1 and a lower frame 2, which, in the example shown, are arranged between the two jaws 13 and 14 of enlarging apparatus. The jaw 14, which is provided with an opening 10, is stationary, whilst the jaw 13, which is provided with an opening 10', is movable and adapted to be pressed toward the stationary jaw by a handwheel 18 through a helical spring.

The frames 1 and 2 are connected together by means of a hinge in such a manner that they can be swung away from each other. The hinge connection consists of pins 8 arranged on the upper frame 1 and lugs 7 arranged on the lower frame 2. The lugs 7 are provided with slotted or like openings, so that the pins 8 together with the frame 2 can be rotated and also displaced relatively to the lower frame.

The lower frame 1 (Figure 4) is also provided with an opening 10 having a profiled recess 20 for the mounting of a mask 3. On corresponding positions on the frame 1 are arranged two rotatable elements 15 for holding a glass plate 4 which is mounted in a recess 19 in the said frame. The mask 3 (Figure 5) is provided, on the one hand, with an opening 9 and, on the other hand, with two pairs of guiding projections 17 for a film negative, for instance, the distance between the projections of each pair, as well as the dimensions of the opening, being in accordance with the dimensions of the film employed.

The upper frame 2 is also provided with an opening 10' and with a profiled recess 21 for mounting a glass plate 5 which is retained securely in known manner, by means of two rotatable holding elements 16. The recesses 19 and 21 in the frames 1 and 2, respectively, are formed in such a manner that the respective glass plates lie across one another and the holding elements 15 and 16 are staggered in relation to each other and are arranged in such positions that they always lie outside the surface of the opposite glass plate, so that they do not obstruct in any way when the frames are clamped together. The upper frame 2 is also provided with two grooves 11 in which the film-guiding projections 17 on the lower frame 1 engage when the frames are folded together.

On the stationary lower frame 1 there are provided two flat springs 6 which act on the upper frame 2. By releasing the handwheel 18, the jaw 13 is also released and the upper frame is raised by the action of the flat springs 6. At the commencement, the upper frame is permitted to be displaced by reason of the formation of the openings in the bearing lugs 7. This displacement is sufficient to cause disengagement of the frames 1 and 2 from each other only to such an extent as to enable the inserted film to be shifted and another picture to come in front of the opening 9 in the mask 3.

On further release of the handwheel 18, the top frame tilts about the pins 8 into such a position (Figure 2) that it is possible to remove, without difficulty, the film with the mask of the corresponding shape, or the glass negative plate if the latter is employed. After the insertion of the new film with the mask or of the negative plate, the jaws 13 and 14 are clamped together by actuating the handwheel 18 and, in this manner, the frame 2 is applied to the frame 1, with the result that a correct clamping of the negative is obtained.

What I claim is:

A negative support for projection and enlarging apparatus comprising a pair of jaws, means for moving one of said jaws toward and away from the other, a pair of frames disposed between said jaws, a loose pivot connection between said frames, resilient means urging said frames apart so that when said frames are released by said jaws one of said frames describes first a perpendicular movement away from the other frame and then a swinging movement therefrom, said movable frame having a recess for the interchangeable positioning of the base of the glass plate of the negative or the glass plate itself and the fixed frame having guide means thereon for a cut film or a film strip.

KAMILLO KALLUSCH.